United States Patent [19]

Inata et al.

[11] Patent Number: 5,216,109
[45] Date of Patent: Jun. 1, 1993

[54] CRYSTALLINE WHOLLY AROMATIC POLYESTER, PROCESS FOR ITS PRODUCTION, RESIN COMPOSITION CONTAINING IT, AND ARTICLES FROM THE RESIN COMPOSITION

[75] Inventors: Hiroo Inata; Shunichi Matsumura; Akio Nakaishi, all of Iwakuni, Japan

[73] Assignee: Teijin Limited, Osaka, Japan

[21] Appl. No.: 743,911

[22] Filed: Aug. 12, 1991

[30] Foreign Application Priority Data

Aug. 22, 1990 [JP] Japan .................................. 2-219061

[51] Int. Cl.$^5$ ...................... C08G 63/02; C08G 63/18; C08G 63/00
[52] U.S. Cl. .................................... 528/272; 524/599; 524/601; 528/176; 528/193; 528/194; 528/219; 528/271
[58] Field of Search ................ 524/599, 601; 528/176, 528/193, 194, 219, 272, 271

[56] References Cited

U.S. PATENT DOCUMENTS

| | | |
|---|---|---|
| 3,036,991 | 5/1962 | Kantor et al. ........... 528/194 |
| 3,160,602 | 12/1964 | Kantor et al. ........... 528/191 |

FOREIGN PATENT DOCUMENTS

| | | |
|---|---|---|
| 58-047019 | 3/1983 | Japan . |
| 3-014620 | 1/1991 | Japan ................. 528/193 |
| 3-028221 | 2/1991 | Japan ................. 528/193 |

*Primary Examiner*—John Kight, III
*Assistant Examiner*—T. Mosley
*Attorney, Agent, or Firm*—Sherman and Shalloway

[57] ABSTRACT

A crystalline wholly aromatic polyester:
(1) which consists essentially of
   a polymer unit A of the formula

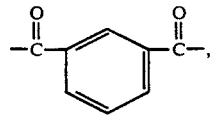

a polymer unit B of the formula

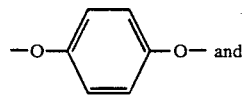

a polymer unit C of the formula

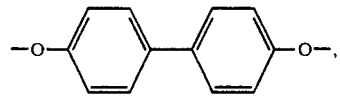

these polymer units being bonded together to form an ester having a linkage (—COO—),
(2) which has a melting point lower than that of the known crystalline wholly aromatic polyester having same composition; a process for the production of a crystalline wholly aromatic polyester, using a phenol or phenol derivative as a reaction medium; a reinforced resin composition comprising the above wholly aromatic polyester; and a shaped or molded article formed from the above resin composition.

12 Claims, No Drawings

CRYSTALLINE WHOLLY AROMATIC POLYESTER, PROCESS FOR ITS PRODUCTION, RESIN COMPOSITION CONTAINING IT, AND ARTICLES FROM THE RESIN COMPOSITION

DETAILED DESCRIPTION OF THE INVENTION

The present invention relates to a crystalline wholly aromatic polyester, a process for the production thereof, a resin composition containing the same, and molded or shaped articles formed from the resin composition. More specifically, the present invention relates to a crystalline wholly aromatic polyester being excellent in heat resistance, frame retardancy, mechanical properties and moldability and being optically isotropic in a molten state, a process for its production, a resin composition containing it, and molded or shaped articles from the resin composition.

U.S. Pat. No. 3,036,991 discloses a linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

The above U.S. Pat. No. 3,036,991 discloses in Example 1 that polymers having a melting point of 360° to 370° C. are obtained by polycondensation of a mixture containing 0.04 mole of hydroquinone, 0.01 mole of 4,4'-dihydroxybiphenyl and 0.05 mole of isophthaloyl chloride in pentachlorobiphenyls. This patent also discloses in Example 2 that polymers having a melting point of 388° to 394° C., 362° to 379° C., 355° to 372° C. and 355° to 374° C., respectively, are obtained by a similar acid chloride method when the hydroquinone/4,4'-dihydroxybiphenyl molar ratio is 90/10, 80/20, 70/30 and 60/40. Further, in Example 3, it discloses a method of polycondensation of p-phenylene diacetate (0.082 mole), 4,4'-diacetoxybiphenyl (0.020 mole) and isophthalic acid (0.100 mole) in trichlorobiphenyls.

U.S. Pat. No. 3,160,602 discloses a process of producing a linear superpolyester of an aromatic dicarboxylic acid and an dihydric phenol which comprises reacting a mixture of reactants consisting essentially of an aromatic dicarbonyl halide and a dihydric phenol, while these reactants are dissolved in a solvent selected from the group consisting of benzophenone, m-terphenyl, chlorinated biphenyl, brominated biphenyl, chlorinated diphenyl oxide and brominated diphenyl oxide, at a temperature in the range of about 270° C. up to the reflux temperature of the solution until at least the evolution of the hydrogen halide substantially ceases, by which time the superpolyester formed has an intrinsic viscosity of at least 0.5 measured at 75° C., and isolating the solid polymer from the reaction mixture.

The above U.S. Pat. No. 3,160,601 discloses in Example 4 that polymers having a melting point of 360° to 370° C. are obtained by polycondensation of a mixture containing hydroquinone (0.04 mole), 4,4'-dihydroxybiphenyl (0.01 mole) and isophthaloyl chloride (0.05 mole) in pentachlorobiphenyls. This patent also discloses in Example 5 that polymers having a melting point of 355° to 372° C. are obtained from hydroquinone (0.0715 mole), isophthaloyl chloride (0.100 mole) and 4,4'-dihydroxybiphenyl (0.030 mole).

Japanese Laid-Open Patent Publication 47019/1983 discloses a process for the production of an aromatic copolyester which comprises melt-polymerizing a mixture containing diaryl isophthalate, hydroquinone and 4,4'-dioxybiphenyl or a mixture containing isophthalic acid, hydroquinone, 4,4'-dioxybiphenyl and diaryl carbonate, and then optionally subjecting the resultant polymer to solid phase polymerization.

The above Japanese Laid-Open Patent Publication No. 47019/1983 discloses in Example 1 that a polymer having a melting point of 365° C. is obtained by melt-polymerizing a mixture containing diphenyl isophthalate (0.62 mole), hydroquinone (0.5 mole) and 4,4'-dioxybiphenyl (0.11 mole) to obtain a polymer having a melting point of 360° C. and further subjecting the resulting polymer to solid phase polymerization. This publication also discloses in Example 2 that a polymer having a melting point of 360° C. is obtained by melt-polymerizing a mixture containing diphenyl isophthalate (0.62 mole), hydroquinone (0.41 mole) and 4,4'-dioxybiphenyl (0.13 mole) to obtain a polymer having a melting point of 355° C. and further subjecting this polymer obtained to solid phase polymerization. This publication also discloses in Example 3 that a polymer having a melting point of 365° C. is obtained by melt-polymerizing a mixture containing diphenyl isophthalate (0.62 mole), hydroquinone (0.35 mole) and 4,4'-dioxybiphenyl (0.28 mole) to obtain a polymer having a melting point of 365° C. and further subjecting this polymer obtained to solid phase polymerization.

Further, the above publication also discloses in Example 10 that a final polymer having a melting point of 360° C. is obtained by melt-polymerizing a mixture containing isophthalic acid (0.74 mole), hydroquinone (0.5 mole), 4,4'-dioxybiphenyl (0.11 mole) and diphenyl carbonate (0.63 mole) to obtain a polymer having a melting point of 360° C. and subjecting this polymer obtained to solid phase polymerization.

It is an object of the present invention to provide a crystalline wholly aromatic polyester.

It is another object of the present invention to provide a crystalline wholly aromatic polyester which has the same composition as those of known polymers but has a lower melting point than those of known polymers.

It is further another object of the present invention to provide a crystalline wholly aromatic polyester which has the same composition as those of known polymers but can be shaped or molded at a lower temperature than those for known polymers.

It is still another object of the present invention to provide a crystalline wholly aromatic polyester which has the same melting point as those of known polymers, but has a different copolymer composition from those of known polymers and excellent crystallizability over known polymers.

It is yet another object of the present invention is to provide a crystalline wholly aromatic polyester which is excellent in heat resistance, flame retardancy, mechanical properties and moldability, and is optically isotropic in a molten state.

It is further another object of the present invention to provide a process for the production of the above crystalline wholly aromatic polyester of the present invention very advantageously in industry.

Further, it is another object of the present invention to provide a reinforced resin composition containing the above crystalline wholly aromatic polyester of the present invention, and molded and shaped articles therefrom such as fibers, films, and the like.

The above objects and advantages and other objects and advantages of the present invention will be apparent from the following description.

According to the present invention, the above objects and advantages of the present invention are achieved, first, by a novel crystalline wholly aromatic polyester:

(1) which consists essentially of:
a polymer unit A of the formula

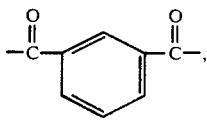

a polymer unit B of the formula

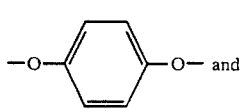 and a polymer unit C of the formula

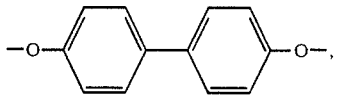, these polymer units being bonded together to form an ester having a linkage (—COO—), (2) which has a melting point satisfying the following relationship, $$-2 \cdot X + 370 < Tm(°C.) < -2 \cdot X + 388$$

wherein X is a molar ratio (percent) of the polymer unit C to the total of the polymer units B and C, and Tm is a melting point (°C.) of the polyester, provided that X is a number in the range of 10 to 35 mole %, and (3) which has an inherent viscosity, measured in a phenol/tetrachloroethane mixed solvent having a phenol/tetrachloroethane weight ratio of 60/40 at 35.° C., in the range of 0.4 to 2.

The above crystalline wholly aromatic polyester of the present invention consists essentially of an isophthalic acid moiety (polymer unit A), a hydroquinone moiety (polymer unit B) and a 4,4'-dihydroxybiphenyl moiety (polymer unit C), and these polymer units are bonded together to form an ester having a linkage (—COO—).

One ester linkage is formed between a polymer unit A and a polymer unit B, and another ester linkage is formed between a polymer unit A and a polymer unit C. It is therefore understood that the polymer of the present invention consists essentially of the following units forming an ester linkage, i.e. polymer units AB of the formula

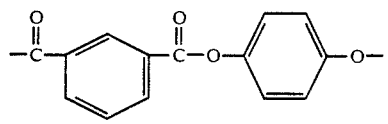

and polymer units AC of the formula

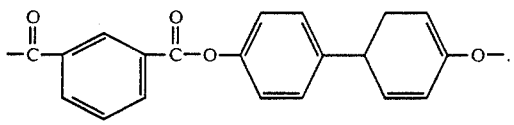

In the wholly aromatic polyester of the present invention, the amount of the polymer unit C on the basis of the total of the polymer units B and C is 10 to 35 mole %, preferably 12 to 30 mole %.

In the wholly aromatic polyester of the present invention, the composition (molar ratio) of the polyester-constituting polymer units and the melting point of the polyester have the following relationship, $$-2 \cdot X + 370 < Tm(°C.) < -2 \cdot X + 388$$

wherein X is a molar ratio (percent) of the polymer unit C to the total of the polymer units B and C, and Tm is a melting point (°C.) of the polyester, provided that X is a number in the range of 10 to 35 mole %.

These composition and melting point preferably have the following relationship, $$-2 \cdot X + 372 < Tm(°C.) < -2 \cdot X + 388$$

For example, when X is 20 mole %, the wholly aromatic polyester of the present invention has a melting point of 330° to 348° C. as shown in the above relationship. Conventional polymers having the same composition (X=20) have a melting point of 360° to 370° C. as described in Example 1 of U.S. Pat. No. 3,036,991 and Example 4 of U.S. Pat. No. 3,160,602 referred to in beginning part of the present specification. It is therefore understood that the wholly aromatic polyester of the present invention has a remarkably decreased melting point.

The wholly aromatic polyester of the present invention satisfies the above relationship and has a characteristic feature in that the melting point is considerably lower than that of a conventional polymer having the same composition. This lower melting point contributes toward improvement in the melt-shapability and melt-moldability of the wholly aromatic polyester of the present invention.

The above feature of the wholly aromatic polyester of the present invention is considered to be produced by a difference between the distributions of the polymer units B and C, in other words, sequence in the polymer chain and those of the conventioinal same-type polymers.

Further, the wholly aromatic polyester of the present invention has an inherent viscosity, measured in a phenol/tetrachloroethane (60/40 by weight) mixed solvent at 35° C., in the range of 0.4 to 2, preferably 0.45 to 1.3.

According to the present invention, the crystalline wholly aromatic polyester of the present invention is advantageously produced by directly subjecting isophthalic acid, hydroquinone and 4,4'-dihydroxydiphenyl to an esterification reaction in a reaction medium selected from phenols.

According to the present invention, therefore, as a process for the production of crystalline wholly aromatic polyesters which include the above-specified crystalline wholly aromatic polyester of the present invention, there is provided a process which comprises melting under heat starting materials of (1) an aromatic dicarboxylic acid which is isophthalic acid or contains isophthalic acid as a main acid component, (2) hydroquinone, (3) at least one compound selected from the group consisting of (3-1) 4,4'-dihydroxydiphenyl and (3-2) p-hydroxybenzoic acid, 2-hydroxy-6-naphthoic acid or any one of ester-forming derivatives of these, and (4) a phenol or phenol derivative which may be substituted with an alkyl group having 1 to 5 carbon atoms, in such amounts which satisfy the following relationships, $1.3 \geq (B+C)/A \geq 0.9$,
$0.21 \geq (C+D)/(A+B+C+D) \geq 0.05$, and
$E/A \geq 0.05$ wherein:

A is a molar amount of the aromatic dicarboxylic acid (1),

B is a molar amount of the hydroquinone (2),

C is a molar amount of the 4,4'-dihydroxydipohenyl (3-1) in the compound (3),

D is a molar amount of the compound (3-2) in the compound (3), and

E is a molar amount of the phenol or phenol derivative (4), in the presence of an esterification catalyst to form a wholly aromatic polyester having an inherent viscosity in the range between 0.4 and 2.

The aromatic dicarboxylic acid used in the present invention is isophthalic acid or contains isophthalic acid as a main acid component. The aromatic dicarboxylic acid used as an acid subcomponent in combination with isophthalic acid is preferably selected, for example, from terephthalic acid, naphthalene-2,6-dicarboxylic acid, naphthalene-2,7-dicarboxylic acid, diphenyl dicarboxylic acid, diphenyl ether dicarboxylic acid, diphenylsulfone dicarboxylic acid, etc.

The amount of the above acid subcomponent based on the total aromatic carboxylic acids is not more than 20 mole %, preferably not more than 10 mole %.

In the process of the present invention, hydroquinone (2) is used, and further, the compound (3) is used, as the starting materials.

The compound (3) is at least one member selected from the group consisting of 4,4'-dihydroxydiphenyl (3-1), and one of p-hydroxybenzoic acid, 2-hydroxy-6-naphthoic acid and ester-forming derivatives of these (3-2).

That is, the compound (3) is any one of the following: (3-1) 4,4'-dihydroxydiphenyl, (3-2) p-hydroxybenzoic acid, 2-hydroxy-6-naphthoic acid or any one of ester-forming derivatives of these, and a combination of compounds (3-1) and (3-2).

The ester-forming derivatives include esters of p-hydroxybenzoic acid and 2-hydroxy-6-naphthoic acid in which the ester bond is formed in the hydroxyl group (e.g. lower aliphatic acid esters such as acetic acid ester) or the ester bond is formed in the carboxyl group (e.g. aryl esters such as phenyl ester).

As a compound (3-2), preferred are p-hydroxybenzoic acid and ester-forming derivatives thereof, and as an ester-forming derivative, preferred is a phenyl ester in particular.

Part of the compound (3), i.e., not more than 50 mole % of the compound (3), preferably not more than 30 mole % of the compound (3), more preferably not more than 10 mole % of the compound (3) may be replaced with a lower alkyl-substituted hydroquinone such as 2,2-bis(p-hydroxyphenyl)propane, 1,1-bis(p-hydroxyphenyl)cyclohexane, a $C_2$–$C_6$ alkylene glycol or the like.

The phenol or phenol derivative (4) used together with the above compounds (1), (2) and (3) may be substituted with an alkyl group having 1 to 5 carbon atoms.

Examples of the phenol or phenol derivative are preferably phenol, m-cresol, p-cresol, p-butylphenol, p-amylphenol, etc. Of these, preferred are phenol and cresols, and particularly preferred is phenol.

The phenol or phenol derivative (4) is not used as a constituent for the wholly aromatic polyester to be formed, but used as a reaction medium which works in the initial stage of a reaction among the above compounds (1), (2) and (3).

In the process of the present invention, the compounds (1), (2) and (3) are used in such amounts that satisfy the following two relationships at the same time:

$$1.3 \geq (B+C)/A \geq 0.9 \qquad (a)$$

$$0.21 \geq (C+D)/(A+B+C+D) \geq 0.05 \qquad (b)$$

In the above relationships, A is a molar amount of the compound (1), B is a molar amount of the hydroquinone (2), C is a molar amount of the 4,4'-dihydroxydiphenyl (3-1), and D is a molar amount of the compound (3-2).

The first relationship (a) shows that the aromatic dicarboxylic acid (1) and the dihydroxy compounds (compounds (2) and (3-1)) should be used with retaining a proper balance in order to form a polymer chain. That is, when the first relationship (a) is not satisfied, it is difficult to increase the degree of polymerization and the reaction mixture is liable to be colored.

The compounds (1), (2) and (3-1) preferably has the following relationship.

$$1.2 \geq (B+C)/A \geq 1.0 \qquad (a')$$

The second relationship (b) is intended to define the proportion of the polymer unit derived from the compound (3) based on the wholly aromatic polyester. That is, when the value of $(C+D)/(A+B+C+D)$ is less than 0.05, the resultant polymer undesirably has too high a melting point, and its melt-polymerization and molding is difficult. When this value exceeds 0.21, the crystallization rate of the polymer undesirably increases, and the resultant polymer has anisotropy.

The compounds (1), (2), (3-1) and (3-2) preferably have the following relationship.

$$0.20 \geq (C+D)/(A+B+C+D) \geq 0.07 \qquad (b')$$

In the process of the present invention, the phenol or phenol derivative (4) is used in such a proportion as to satisfy the following relationship with the compound (1).

$$E/A \geq 0.05 \qquad (c)$$

E is a molar amount of the phenol or phenol derivative (4). When the amount of the phenol or phenol derivative does not satisfy the above relationship, there are problems in that the reaction proceeds very slowly and that the reaction product is liable to decompose and in consequence, be colored.

The above relationship is preferably $$5 \geq E/A \geq 0.1 \quad (c')$$

more preferably $$2 \geq E/A \geq 0.2 \quad (c'')$$

particularly preferably $$1.5 \geq E/A \geq 0.3 \quad (c''')$$

In the process of the present invention, the above components (1), (2), (3) and (4) are melted under heat in the presence of an esterification catalyst.

The esterification catalyst is preferably selected from antimony trioxide, stannous acetate, dibutyl tin oxide, germanium sulfide, titanium tetrabutoxide, etc.

During the melting under heat, the esterification and ester interchange reactions proceed to form a wholly aromatic polyester.

The melting reaction will be conveniently explained by separating it into an initial reaction and a polymerization reaction.

The initial reaction refers to a stage in which the esterification is carried out by the reaction of about 50 to about 95% of carboxyl groups of the aromatic carboxylic acids (the compounds (1) and (3-2)) with the hydroxy components (compounds (2), (3-1), (3-2) and (4)) to form esters. In this stage, water is formed due to the reaction, and the water is distilled off from the reaction system. It is necessary to take care not to distill the phenol or phenol derivative (4) from the reaction system.

The next polymerization reaction refers to a stage in which the esterification further proceeds, and at the same time the ester interchange reaction also proceeds between esters formed and other hydroxy components whereby the polymerization proceeds. In this stage, the phenol or phenol derivative (4) is distilled off together with water. Although it is difficult to draw a distinct line between the initial reaction and the polymerization reaction, there is the distinction in that the phenol or phenol derivative (4) is positively restrained from distillation off out of the reaction system in the initial reaction and is allowed to be distilled off in the polymerization reaction.

Generally, the reaction temperature in the initial reaction is preferably not less than 150° C., more preferably not less than 180° C., particularly preferably not less than 230° C. It is preferred to increase the reaction temperature with an advance in the reaction. In this case, the upper limit of the reaction temperature is preferably 330° C., more preferably about 300° C.

The initial reaction can be carried out under an atmospheric pressure or under an applied pressure. When the phenol or phenol derivative (4) has a particularly lower boiling point than the reaction temperature under an atmospheric pressure, it is preferred to carry out the reaction under an applied pressure. It is preferred that the reaction is carried out in an atmosphere of an inert gas such as nitrogen, argon, etc.

The initial reaction time is set such that the above esterification reaction proceeds sufficiently, and the initial reaction time varies depending upon the total reaction time and a reaction scale. In general, however, the reaction time is preferably 30 minutes to 20 hours, preferably about 1 hour to about 10 hours.

In the above reaction, it is preferred to remove water formed during the esterification out of the reaction system. The esterification reaction is an equilibrium reaction. According as water being formed is removed out of the system, the reaction proceeds, and the yield and purity of the product increase. The formed water can be removed out of the system owing to a difference in the boiling point between water and the phenol or phenol derivative (4), or alternatively, it can be removed out of the system by azeotropy in the presence of an organic solvent which forms an azeotropic mixture with water. This organic solvent refers to a solvent which is not decomposed under the reaction conditions, i.e. which is substantially stable under the reaction system and forms an azeotrope with water. Specifically, aromatic hydrocarbons such as toluene, xylene, ethylbenzene, etc., are preferred.

In the initial reaction, the esterification reaction ratio of 50% or more is preferred. This esterification reaction ratio can be obtained on the basis of an amount of water formed due to the reaction. This ratio can be more exactly obtained by taking part of the reaction product and measuring it for an unreacted —COOH value.

In the initial reaction, the esterification ratio is more preferably 60% to 95%, particularly preferably 70% to 95%. The polymerization is preferably carried out at a temperature between the initial reaction temperature and 380° C. In the process of the present invention, the polymerization reaction is always carried out while the reaction mixture is melted.

With an advance in the polymerization, the melting point of the reaction product increases. It is therefore preferred to carry out the polymerization reaction with gradually increasing the temperature in the reaction system. For example, when the polymer has an inherent viscosity of up to about 0.5, the polymerization reaction is carried out at a temperature between about 230° C. and 340° C. When the polymer has a higher inherent viscosity than the above, the polymerization reaction is carried out at a temperature preferably between 340° C. and 380° C., more preferably between 340° C. and 360° C. In this case, the phenol or phenol derivative (4) can be recovered for reuse.

The wholly aromatic polyester obtained by the process of the present invention has a relatively high melt viscosity. Therefore, the melt polymerization for a high polymerization degree is carried out preferably with a reactor of an extruder type.

The polymerization reaction is advantageously carried out under reduced pressure or an inert gas flow while water formed due to the reaction, the phenol or phenol derivative and dihydroxy aromatic compound such as hydroquinone, which has been used in an excess amount as required, are removed out of the reaction system.

According to the process of the present invention as described above, a wholly aromatic polyester having an inherent viscosity of 0.4 to 2 can be obtained. The inherent viscosity is preferably 0.45 to 1.3, more preferably 0.45 to 1 for fibers, films, and fibrous reinforcing material-incorporated resin and 0.7 to 1.3 for molded articles of the polymer alone.

As is understood from the above description, the process of the present invention is carried out as described in the following preferred embodiment. That is, at first, the melting under heat is carried out until about 50 to about 95% of carboxyl groups of the starting materials are esterified while formed water is distilled off out of the system under the conditions in which the phenol or phenol derivative (4) is hardly distillable off from the system; and thereafter, the melting under heat is carried out while formed water and the phenol or phenol derivative (4) are distilled off from the system, whereby the polyester having a desired molecular weight is obtained.

The crystalline wholly aromatic polyester obtained by the above process of the present invention has optical isotropy in a molten state and a relatively low melting point. Therefore, it is melt-moldable and melt-shapable according to any of conventional methods such as extrusion forming, melt-spinning, injection molding, etc. Moreover, articles obtained by melt-molding or melt-shaping this polyester are not only excellent in mechanical properties, dimensional stability, heat resistance, chemical resistance and flame retardancy but also has low susceptibility to water. This wholly aromatic polyester is therefore very useful as a material for engineering plastics, fibers, films, etc.

According to the present invention, there is further provided a reinforced resin composition which makes the best use of the above excellent properties of the wholly aromatic polyester of the present invention.

That is, the reinforced resin composition of the present invention comprises:

(1) a crystalline wholly aromatic polyester produced by the process of the present invention, and (2) a fibrous reinforcing material, the amount of the above component (2) being 5 to 70% by weight based on the total of the components (1) and (2).

Particularly preferred is a reinforced resin composition of which the crystalline wholly aromatic polyester (1) is a wholly aromatic polyester formed of the polymer units A, B and C.

The fibrous reinforcing material (2) is selected, for example, from glass fibers, carbon fibers, aramid fibers, silicon carbide fibers, alumina fibers, potassium titanate fibers, etc. The fibrous reinforcing material preferably has an aspect ratio of 10 or more. This aspect ratio refers to a ratio of the fiber length to the fiber diameter. When there exists a distribution in an aspect ratio of the reinforcing material, the average is to be taken as an aspect ratio. When the aspect ratio is less than 10, the reinforcing effect on the mechanical properties and heat resistance is undesirably insufficient. Of the above fibrous reinforcing materials, particularly preferred are glass fibers having an average fiber diameter of about 5 to about 20 $\mu$m.

In order to improve the affinity of the fibers with the wholly aromatic polyester or for the improved handling properties of fibers per se, it is desired that fibers be properly surface-treated with a coupling agent or a sizing agent.

The wholly aromatic polyester/reinforcing fiber mixing ratio is 95-30% by weight/5-70% by weight. The wholly aromatic polyester/reinforcing material is preferably 90-40% by weight/10-60% by weight, particularly preferably 85-50% by weight/15-50% by weight.

The wholly aromatic polyester and the fibrous reinforcing material can be mixed according to a conventional compounding method.

The wholly aromatic polyester of the present invention and the reinforced resin composition of the present invention may contain not more than 50% by weight, preferably 10 to 50% by weight, based on the wholly aromatic polyester, of other polymers such as a polyester (e.g. polyethylene terephthalate, polybutylene terephthalate, polyethylene naphthalate, polybutylene naphthalate, etc.), polyphenylene sulfide, polysulfone, liquid crystal polyarylate, polyphenylene ether, polyether imide, polyether ketone, etc. There may be also contained a filler such as $CaCO_3$; a nucleating agent such as talc; a metal powder; a metal soap such as calcium stearate; a plasticizer; a thermal stabilizer such as phosphorous acid, phosphoric acid, triphenyl phosphite, triphenyl phosphate, triphenyl phosphine, etc.; a pigment; and a UV light absorber.

The reinforced resin composition of the present invention is subjected to a known molding method, e.g. injection molding, to give a variety of molded articles. Molded articles produced from the present reinforced resin composition can have heat resistance sufficient to exhibit a heat distortion temperature, under a load of 4.6 $kg/cm^2$, of 300° C. or higher. The wholly aromatic polyester of the present invention can be also melt-shaped to fibers, films or other articles. In case of producing fibers and films, it is desirable that the polyester be first melt-shaped, and then subjected to elongation and heatsetting treatment.

As described above, the wholly aromatic polyester of the present invention can be produced from inexpensive materials and according to a melt-polymerization method, and further, the phenol or phenol derivative (4) can be recovered and re-used. Accordingly, the wholly aromatic polyester of the present invention can be industrially advantageously produced at a remarkably low cost. Further, the wholly aromatic polyester obtained according to the present invention is a crystalline wholly aromatic polyester having a melting point of 300° C. or higher, and the reinforced resin composition of the present invention, which comprises the above crystalline wholly aromatic polyester and a fibrous reinforcing material, is excellent particularly in heat resistance, mechanical properties, chemical resistance and flame retardancy, and is very useful as a novel heat-resistant resin. Therefore, the crystalline wholly aromatic polyester and reinforced resin composition of the present invention has great industrial significance.

The present invention will be explained further in detail hereinafter by reference to Examples, in which "part" stands for "part by weight". In Examples, the inherent viscosity each of polymers was measured in a concentration of 0.3 g/dl in a phenol/tetrachloroethane (weight ratio 60/40) mixed solvent at a temperature of 35° C. The melting point (Tm) and glass transition temperature (Tg) each of polymers were measured with DSC at a temperature elevation rate of 10° C./minute. Further, the tensile strength and elongation at break were measured according to ASTM D638, the flexural strength and flexural modulus were measured according to ASTM D790, the impact strength was measured according to ASTM D 256, and the heat distortion temperature was measured according to ASTM D648. Method for determination of polymer composition (molar ratio X) was as follows: 0.2 Gram of a polymer was refluxed in nitrogen gas current under heat for 10 minutes together with 2.0 g of ethylene glycol and 0,2 g of potassium hydroxide. After the complete dissolution of the polymer, the mixture was cooled, and acidified with 6N HCl, during which a precipitate was formed. Then, 30 ml of methanol was added to the mixture to dissolve the precipitate. The resultant solution was used as a sample. The sample was analyzed with a liquid chromatography system (Waters 600, supplied by Waters) equipped with a reversed phase column (Lichrosorb RP18, supplied by Merck). Methanol (0.05N, phosphoric acid) was used as a separating liquid. From peak strength of hydroquinone and dihydroxydiphenyl, the molar ratios of these two components were calculated, and the molar ratio X of the polymer unit C in the diol component (polymer units B+C) in the polymer was determined.

EXAMPLE 1

A reactor having a stirrer and a distillation system was charged with 166 parts of isophthalic acid, 81 parts of hydroquinone, 59 parts of 4,4'-dihydroxydiphenyl, 47 parts of phenol and 0.09 part of antimony trioxide (the isophthalic acid/hydroquinone/4,4'-dihydroxydiphenyl/phenol molar ratio corresponding to 100/73.5/31.5/50). The mixture was pressurized with nitrogen and heated to 280° C. While the pressure was gradually decreased from 5 kg/cm$^2$G to 2 kg/cm$^2$G, and while water being formed due to the reaction was distilled off from the reaction system, the mixture was allowed to react for 5 hours. During this reaction, 28 parts of water was formed (esterification reaction ratio 78%). Then, the reaction system was restored to an atmospheric pressure, and the reaction mixture was allowed to react under a nitrogen gas current for 60 minutes while volatiles were distilled off from the system. During this reaction, the reaction temperature was increased from 280° C. to 330° C. Thereafter, the pressure inside the system was gradually reduced to a high vacuum of about 0.5 mmHg over 60 minutes, and the reaction mixture was allowed to react for 60 minutes, whereby a polymer was obtained. The polymer was a well-crystallized polymer having an inherent viscosity of 0.78, Tm of 325° C., Tg of 170° C., and X of 30 mole %.

The process described in Example 5 of U.S. Pat. No. 3,160,602 was duplicated to obtain a polymer. It was found that this polymer had nearly the same composition as that of the polymer of this Example, but had Tm of 355° to 372° C.

EXAMPLE 2

The same reactor as that of Example 1 was charged with 116 parts of isophthalic acid, 81 parts of hydroquinone, 64 parts of phenyl p-hydroxybenzoate, 46 parts of phenol, 0.1 part of stannous acetate and 100 parts of ethylbenzene (the isophthalic acid/hydroquinone/phenyl p-hydroxybenzoate/phenol molar ratio corresponding to 70/73.5/30/49). The mixture was allowed to react while the temperature inside the reactor was gradually increased from 230° C. to 280° C. and while the pressure was adjusted so as to distill off water formed during the reaction by azeotropy with ethylbenzene. During the reaction for about 7 hours, 21 parts of water was distilled off (esterification reaction ratio 83%). Then, the reaction system was restored to an atmospheric pressure, and the subsequent melt-polymerization was carried out in the same manner as in Example 1 except that the final reaction temperature was set at 340° C., whereby a polymer was obtained.

The polymer obtained was a crystalline polymer having optical isotropy in a molten state and crystalline properties, and having an inherent viscosity of 0.81, Tm of 328° C. and Tg of 162° C.

EXAMPLES 3–7 AND COMPARATIVE EXAMPLE 1

The same reactor as that of Example 1 was charged with isophthalic acid, hydroquinone, 4,4'-dihydroxydiphenyl, phenyl p-hydroxybenzoate, either phenol or phenol derivative, and a catalyst of which the amounts are as shown in Table 1, and nitrogen was substituted for air inside the reactor. The mixture was allowed to react under the conditions described in Table 1 and water formed during the reaction was distilled off. The esterification ratio determined on the basis of the amount of water distilled off is shown in the column "reaction ratio" in Table 1. Then, the reaction system was restored to an atmospheric pressure, and under nitrogen gas current at 280° C., the reaction mixture was allowed to react for 60 minutes with distilling off volatiles. Then, the temperature inside the reactor was increased to a temperature described in Table 1 for 30 minutes, and the reaction mixture was allowed to react further for 30 minutes. Thereafter, the pressure within the system was gradually reduced to attain a high vacuum of not more than 0.5 mmHg when 30 minutes passed. Further, the reaction mixture was allowed to react for a period of time described in Table 1. In all of Examples 3 to 7, optically isotropic and well crystallized polymers were obtained. Table 1 shows the inherent viscosity, Tm and Tg of each polymer.

In addition, as Comparative Example 1, it was attempted to repeat the above procedures without using any phenol component. In this case, however, the reaction product was decomposed and colored, and no polymerization was possible.

When the results of Examples 1 to 7 are contrasted with the result of Comparative Example 1, it is seen that due to the incorporation of a predetermined amount of a phenol or phenol derivative into the system according to the present invention, the esterification reaction and the ester interchange reaction proceed in the system consecutively and efficiently, and an excellent polymer having a high polymerization degree can be produced with good productivity even by melt-polymerization only.

TABLE 1

| | Starting material (part by weight) [molar ratio] | | | | | |
|---|---|---|---|---|---|---|
| | Isophthalic acid | Hydroquinone | 4,4'-dihydroxy-phenyl | phenyl p-hydroxy-benzoate | Phenol or phenol derivative | Catalyst |
| Ex. 3 | 166 | 69 | 74 | 0 | Phenol 23 | Stannous acetate 0.1 |
| | [100] | [63] | [40] | [0] | [24] | |
| Ex. 4 | 166 | 90 | 52 | 0 | 94 | Stannous acetate 0.1 |
| | [100] | [82] | [28] | [0] | [100] | |
| Ex. 5 | 166 | 94 | 41 | 0 | 85 | Stannous acetate 0.1 |

TABLE 1-continued

|      |   |   |   |   |   |   |
|------|---|---|---|---|---|---|
|      | [100] | [85] | [22] | [0] | [90] |  |
| Ex. 6 | 166 | 77 | 65 | 0 | p-cresol 23 | Antimony trioxide 0.09 |
|      | [100] | [70] | [35] | [0] | [21] |  |
| Ex. 7 | 149 | 81 | 37 | 14 | p-t-amylphenol 81 | Titanium tetrabutoxide 0.1 |
|      | [90] | [74] | [20] | [10] | [50] |  |
| CEx. 1 | 166 | 81 | 59 | 0 | none | Stannous acetate 0.1 |
|      | [100] | [73.5] | [31.5] | [0] | [0] |  |

| | Esterification (initial reaction) | | | Polymerization reaction | | Polymer properties | | | |
|---|---|---|---|---|---|---|---|---|---|
| | Temperature (°C.) | Pressure (kg/cm$^2$G) | Time (hr) | Reaction ratio (%) | Final temperature (°C.) | Polymerization time at high vacuum (min.) | Intrinsic viscosity | Tm (°C.) | Tg (°C.) | X (mol %) |
| Ex. 3 | 270–280 | 4–0 | 5 | 72 | 330 | 60 | 0.76 | 320 | 169 | 39 |
| Ex. 4 | " | 4–0.5 | 5 | 75 | 340 | 100 | 0.97 | 327 | 171 | 27 |
| Ex. 5 | " | " | 5 | 74 | 345 | 120 | 1.03 | 336 | 171 | 22 |
| Ex. 6 | 270–290 | 3–0.5 | 5 | 71 | 330 | 60 | 0.79 | 323 | 170 | 32 |
| Ex. 7 | 200–280 | Atmospheric pressure | 6 | 77 | 330 | 60 | 0.82 | 327 | 166 | — |
| CEx. 1 | 270–290 | Atmospheric pressure | Colored and decomposed | | | | | | | |

EXAMPLE 8

A reactor having a stirrer and a distillation system was charged with 166 parts of isophthalic acid, 99 parts of hydroquinone, 28 parts of 4,4'-dihydroxydiphenyl, 94 parts of phenol and 0.09 part of antimony trioxide (the isophthalic acid/hydroquinone/4,4-dihydroxydiphenyl/phenol molar ratio corresponding to 100/90/15/100), and the mixture was heated to 280° C. under a nitrogen pressure. While the pressure was gradually reduced from 5 kg/cm$^2$ to 2 kg/cm$^2$ and while water formed by the reaction was distilled off from the reaction system, the mixture was allowed to react for 5 hours. During this reaction, 29 parts of water was formed. The esterification ratio was 81%. Then, the reaction system was restored to an atmospheric pressure, and while volatiles were distilled off from the reaction system under a nitrogen current, the reaction mixture was allowed to react for 60 minutes. During this reaction, the reaction temperature was increased from 280° C. to 340° C. Then, the reaction system was gradually vacuumed to attain a high vacuum of about 0.5 mmHg over 60 minutes, and the reaction mixture was allowed to react for 40 minutes to give a polymer having an inherent viscosity of 0.41.

Then, the above polymer was melt-reacted in an extruder having two vent holes and being equipped with one-direction revolving twin screws having an L/D of 42 and a diameter of 30 mm under conditions of a polymer temperature of 350° to 360° C., a screw revolutions number of 50 rpm and an average residence time, at a vacuum zone, of 10 minutes. During this melt-reaction, a screw member having a reverse screw to a conventional conveyor screw was provided in the front portion of each vent hole, and the two vent holes were maintained at about 1 mmHg by sealing the vacuum zone with the screw member. The polymer obtained by the melt-reaction in the extruder was optically isotropic and crystalline, and had an intrinsic viscosity of 0.68, Tm of 347° C., Tg of 164° C., and X of 17 mole %.

EXAMPLES 9–12

The aromatic polyester obtained in Example 8 in an amount shown in Table 2 and glass fiber chopped strands having a length of 3 mm (717/P, supplied by Nippon Electric Glass Co., Ltd.) in an amount shown in Table 2 were dry-blended and then melt-blended in a 30 mm$\phi\phi$ singal-screw extruder at a polymer temperature of 360° C. for an average residence time of about 5 minutes. The resultant compound was injection-molded with an injection molding machine (N40A, supplied by Japan Steel Works, Ltd.) at a polymer temperature of 360° C. at a molding cycle of 40 to 60 seconds to prepare test pieces. Table 2 shows the physical properties of the test pieces. It is understood from Table 2 that the resin composition of the present invention has excellent heat resistance and mechanical properties.

TABLE 2

|   | Ex. 9 | Ex. 10 | Ex. 11 | Ex. 12 |
|---|---|---|---|---|
| Aromatic polyester (part) | 80 | 70 | 70 | 60 |
| Glass fiber (part) | 20 | 30 | 30 | 40 |
| Mold temperature (°C.) | 160 | 160 | 200 | 160 |
| Heat distortion temperature (°C.) | | | | |
| load 18.6 kg/cm$^2$ | 220 | 285 | >300 | >300 |
| load 4.6 kg/cm$^2$ | >300 | >300 | >300 | >300 |
| Tensile strength (kg/cm$^2$) | 780 | 1030 | 990 | 1250 |
| Flexural strength (kg/cm$^2$) | 1050 | 1500 | 1450 | 1800 |
| Flexural modulus (kg/cm$^2$) | 59000 | 81000 | 87000 | 112000 |
| Impact strength (kg · cm/cm) ⅛ inch notched Izod | 7.5 | 8.2 | 8.0 | 8.5 |

EXAMPLE 13

For the evaluation of flame retardancy, the test pieces obtained in Example 10 were measured for a limiting oxygen index (L.O.I.) (JIS K7201). The L.O.I. was 36.5, which shows that the resin of the present invention has excellent flame retardancy.

EXAMPLE 14

166 Parts of isophthalic acid, 94 parts of hydroquinone, 37 parts of 4,4'-dihydroxydiphenyl, 94 parts of phenol, 0.09 part of antimony trioxide, 0.33 part of triphenyl phosphate and 30 parts of ethylbenzene (the isophthalic acid/hydroquinone/4,4'-dihydroxydiphenyl/phenol molar ratio corresponding to 100/85.5/20/100) were charged into a pressure reactor having a stirrer and a rectification and circulation column with which the liquid-liquid separation of water and ethylbenzene distilled by azeotropy can be made and the ethylbenzene alone can be circulated. The resultant mixture was heated to 285° C. under a nitrogen pressure of 3.0 kg/cm$^2$, whereby ethylbenzene and water formed due to the esterification reaction were distilled off by azeotropy. The distillate was subjected to liquid-liquid separation in a pot having a clinker gauge, and only ethylbenzene in an upper layer was overflowed and circulated back to the reaction system. The above reaction was continued for 6.5 hours to show that 32.8 parts of water was distilled off (esterification ratio of 91%). Then, the reaction system was restored to an atmospheric pressure, and while volatiles were distilled off from the reaction system, the reaction mixture was allowed to react under a nitrogen atmosphere for 60 minutes. During this reaction, the temperature was increased from 290° C. to 340° C. Thereafter, the pressure within the reaction system was gradually reduced to a high vacuum of 0.5 mmHg over 60 minutes, and the reaction mixture was allowed to react for 90 minutes to give a polymer. The polymer had an inherent viscosity of 0.61, Tm of 346° C., Tg of 158° C., and X of 20 mole %.

EXAMPLE 15

The polymer obtained in Example 14 was dried under hot air at 150° C. for 4 hours, melted at 360° C., melt-extruded through a spinning orifice having a diameter of 0.2 mm and a length of 0.6 mm and taken up at a rate of 30 m/minute.

The as-spun yarn obtained was stretched at a temperature of 220° C. at a stretching ratio of 2.5 times. The resultant stretched yarn was measured to show a tensile strength of 3.3 g/de, an elongation at break of 6% and a Young's modulus of 69 g/de.

EXAMPLE 16

The polymer obtained in Example 14 was dried under hot air at 150° C. for 4 hours, melt-extruded with an extruder at a polymer temperature of 360° C., and cast onto a casting drum maintained at a temperature of 120° C. to give an unstretched film having a thickness of 100 μm. This unstretched film was simultaneously coaxially stretched such that the resultant size was twice both in the machine direction and in the width direction, and the so-stretched film was further heat-treated at fixed lengths at 260° C. for 2 minutes. The resultant film had lengthwise a tensile strength of 15 kg/mm$^2$, an elongation at break of 56% and a Young's modulus of 260 kg/mm$^2$.

EXAMPLE 17

The polymer obtained in Example 5 was injection-molded with an injection molding machine (N40A, supplied by Japan Steel Works Ltd.) under conditions of a polymer temperature of 350° C., a mold temperature of 150° C., an injection pressure of 800 kg/cm$^2$ and a molding cycle of 35 seconds. The resultant molded article had a tensile strength of 840 kg/cm$^2$, a flexural strength of 920 kg/cm$^2$, a flexural modulus of 23,800 kg/cm$^2$, an impact strength (Izod with a notch, ¼ inch thick) of 10.5 kg.cm/cm and a heat distortion temperature (with a load of 18.5 kg/cm$^2$) of 172° C. The flame retardancy of the above molded article (according to UL-94) was rated at V-0 in both cases where it had a thickness of 1/16 inch and 1/32 inch.

EXAMPLE 18

The esterification reaction in Example 2 was repeated except that 64 parts of the phenyl p-hydroxybenzoate was replaced with 79.2 parts of phenyl 2-hydroxy-6-naphtoate. In this reaction, the esterification ratio was 78%. Then, the melt-polymerization reaction was carried out in the same manner as in Example 2 to give a crystalline polymer having an inherent viscosity of 0.76, Tm of 330° C. and Tg of 159° C.

What is claimed is:
1. A crystalline wholly aromatic polyester:
   (1) which consists essentially of
      a polymer unit A of the formula

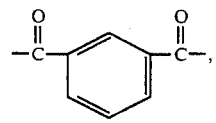

a polymer unit B of the formula

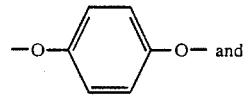

a polymer unit C of the formula

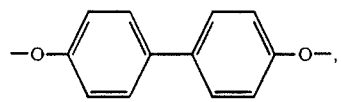

these polymer units being bonded together to form an ester having a linkage (—COO—),
   (2) which has a melting point satisfying the following relationship, $$-2 \cdot X + 370 < Tm(°C.) < -2 \cdot X + 388$$

wherein X is a molar ratio (percent) of the polymer unit C to the total of the polymer units B and C, and Tm is a melting point (°C.) of the polyester, provided that X is a number in the range of 10 to 35 mole %, and
   (3) which has an inherent viscosity, measured in a phenol/tetrachloroethane mixed solvent having a phenol/tetrachloroethane weight ratio of 60/40 at 35° C., in the range of 0.4 to 2.
2. A process for the production of a crystalline wholly aromatic polyester, which comprises melting under heat starting materials of (1) an aromatic dicarboxylic acid which is isophthalic acid or contains isophthalic acid as a main acid component,
(2) hydroquinone,
(3) at least one compound selected from the group consisting of
(3-1) 4,4'-dihydroxydiphenyl and
(3-2) p-hydroxybenzoic acid, 2-hydroxy-6-naphthoic acid or any one of ester-forming derivatives of these, and
(4) a phenol or phenol derivative which may be substituted with an alkyl group having 1 to 5 carbon atoms, in such amounts which satisfy the following relationships, $$1.3 \geq (B+C)/A \geq 0.9,$$

$$0.21 \geq (C+D)/A+B+C+D) \geq 0.5,$$

and $$E/A \geq 0.05$$

wherein:
A is a molar amount of the aromatic dicarboxylic acid (1),
B is a molar amount of the hydroquinone (2),
C is a molar amount of the 4,4'-dihydroxydiphenyl (3-1) in the compound (3),
D is a molar amount of the compound (3-2) in the compound (3), and
E is a molar amount of the phenol or phenol derivative (4), in the presence of an esterification catalyst to form a wholly aromatic polyester having an inherent viscosity in the range between 0.4 and 2.

3. A process according to claim 2, wherein said melting under heat comprises an initial reaction and a polymerization reaction; wherein, in said initial reaction, the starting materials are first heat-melted until about 50 to about 95% of carboxyl groups of the starting materials are esterified while water formed is distilled off; and wherein, in said polymerization reaction, a resultant reaction mixture is heat-melted while formed water and the phenol or phenol derivative (4) are distilled off to achieve esterification.

4. A crystalline wholly aromatic polyester prepared by the process recited in claim 2.

5. A reinforced resin composition comprising (1) a wholly aromatic polyester recited in claim 4 and (2) a fibrous reinforcing material, the (2) fibrous reinforcing material being contained in an amount of 5 to 70% by weight based on the total amount of (1) and (2).

6. A reinforced resin composition comprising (1) a wholly aromatic polyester recited in claim 1 and (2) a fibrous reinforcing material, the (2) fibrous reinforcing material being contained in an amount of 5 to 70% by weight based on the total amount of (1) and (2).

7. A composition according to claim 6, wherein the fibrous reinforcing material is a glass fiber having an aspect ratio of not less than 10.

8. A molded article comprising a reinforced resin composition recited in claim 6.

9. A composition according to claim 6, which has a heat distortion temperature of not less than 300° C.

10. A molded article according to claim 8 wherein a resin composition has a heat distortion temperature of not less than 300° C.

11. A fiber comprising a wholly aromatic polyester recited in claim 1.

12. A film comprising a wholly aromatic polyester recited in claim 1.

* * * * *